United States Patent
Jacobs (10) Patent No.: US 12,417,264 B2
(45) Date of Patent: Sep. 16, 2025

(54) PROTECTION OF BINARY EXECUTABLES USING DYNAMIC ENCRYPTION TECHNIQUES

(71) Applicant: Magic Shell Software, Inc., Olney, MD (US)

(72) Inventor: Anthony Samuel Jacobs, Olney, MD (US)

(73) Assignee: Magic Shell Software, Inc., Olney, MD (US)

( * ) Notice: Subject to any disclaimer, the term of this patent is extended or adjusted under 35 U.S.C. 154(b) by 285 days.

(21) Appl. No.: 18/339,004

(22) Filed: Jun. 21, 2023

(65) Prior Publication Data

US 2023/0418955 A1 Dec. 28, 2023

Related U.S. Application Data

(60) Provisional application No. 63/354,555, filed on Jun. 22, 2022, provisional application No. 63/354,468, filed on Jun. 22, 2022.

(51) Int. Cl.
| | |
|---|---|
| *G06F 21/60* | (2013.01) |
| *G06F 8/41* | (2018.01) |
| *G06F 8/71* | (2018.01) |
| *G06F 9/445* | (2018.01) |
| *G06F 12/14* | (2006.01) |
| *G06F 21/14* | (2013.01) |

(52) U.S. Cl.
CPC ............. *G06F 21/602* (2013.01); *G06F 8/44* (2013.01); *G06F 8/71* (2013.01); *G06F 12/1408* (2013.01); *G06F 2212/1052* (2013.01)

(58) Field of Classification Search
CPC ...... G06F 21/602; G06F 8/44; G06F 12/1408; G06F 8/71; G06F 2212/1052
USPC ........................................................ 713/190
See application file for complete search history.

(56) References Cited

U.S. PATENT DOCUMENTS

| | | | |
|---|---|---|---|
| 9,395,968 B1 * | 7/2016 | Nallagatla | G06F 8/71 |
| 11,113,428 B1 * | 9/2021 | Totah | G06F 21/88 |
| 2008/0049938 A1 * | 2/2008 | Singhal | H04L 9/0869 |
| | | | 380/277 |
| 2011/0173643 A1 * | 7/2011 | Nicolson | G06F 21/575 |
| | | | 719/328 |
| 2018/0341496 A1 * | 11/2018 | Huntley | G06F 15/7867 |
| 2021/0334358 A1 * | 10/2021 | Medvinsky | G06F 21/645 |
| 2023/0145340 A1 * | 5/2023 | Cucu | G06F 21/602 |
| | | | 380/277 |

OTHER PUBLICATIONS

Lakshmanan Nataraja; Detecting Packed Executables Based on Raw Binary Data ; University of California; year: 2010 , pp. 1-6.*

* cited by examiner

*Primary Examiner* — Monjur Rahim
(74) *Attorney, Agent, or Firm* — Seed Intellectual Property Law Group LLP (57) ABSTRACT

A facility for securely executing a program is described. The facility stores a number of encoded modules, each including an encoded block and a type field that contains a resource indicator that in turn identifies an encoding resource. The encoding resource has contents specifying details of a process for decoding the encoded block to obtain a working module containing executable code for a portion of the program.

22 Claims, 8 Drawing Sheets

PROTECTION OF BINARY EXECUTABLES USING DYNAMIC ENCRYPTION TECHNIQUES

CROSS-REFERENCE TO RELATED APPLICATION(S)

This application claims the benefit and priority to each of U.S. Provisional Application No. 63/354,468, filed Jun. 22, 2022, and U.S. Provisional Application No. 63/354,555, filed Jun. 22, 2022, each of which is hereby incorporated by reference in its entirety.

This application is related to U.S. application Ser. No. 18/338,863, entitled "PROTECTION, OBFUSCATION, AND OPTIMIZATION OF BINARY EXECUTABLES USING RECOMPILATION", filed concurrently herewith, which is hereby incorporated by reference in its entirety.

In cases where the present application conflicts with a document incorporated by reference, the present application controls.

BACKGROUND

The term "binary obfuscation" refers to modifying executable code to make it difficult for humans and computers to understand. Current standard practice in binary obfuscation is, among other things, to wrap the entire target binary in an encryption layer so that all of the machine code is encrypted on disk also known as encryption at rest. During execution, the executable is decrypted to temporary storage on disk or in memory and then be executed by means of an inline decryption program.

DETAILED DESCRIPTION

Problem Recognition

The inventor has recognized that the encryption at rest technique is insecure in the sense that it permits the code to be inspected in its decrypted state in the temporary storage, in which it is vulnerable to analysis and attack.

SUMMARY

In response to recognizing this disadvantage, the inventor has conceived and reduced the practice a software and/or hardware facility that performs protection of binary executables using dynamic encryption techniques. The facility wraps a target binary in an encryption envelope. Inside of this envelope, place multiple sub-envelopes, each differently encrypted. The net result will thus avoid all of the code being in an unencrypted portion of memory at the same time.
Methodology The Magic Shell associates each module with a separate encryption envelope using a separate encryption key, that is itself included in the protected data portion of the program as an encoding resource. For most complex software applications, a small working set of modules need to be accessed at any given time, so many modules and encoding resources need not need be actively decrypted and held in working memory.

When this separate encryption technique is used, storage-based analysis tools are unable to access the program because it is encrypted. Partial decryption is insufficient to begin analysis due to the dynamic and continuously changing nature of the module encryption, where each encrypted block can be encoded with a different algorithm or key.

A memory analysis tool is unable to access the entire program in an unprotected state, thus disallowing a useful dump of decrypted application. The goal of the operation is to make analysis difficult while maintaining the processing unit's ability to execute the program as a whole. Consequently, some code blocks may be held in cache in a decoded state, however these portions will be expunged as soon as they are determined to be stale.

Total security is provided by using multiple and discrete encryption encodings, making sure that the processing platform never loads the entire unprotected program at the same time. A very determined attacker could monitor the actual execution and state of memory throughout the entire operation, an attack vector that in various embodiments is blocked by disabling debug access to the system, running on hardware with a protected processing environment, and/or managing Encoding Resource values through a trusted platform module or secure enclave.

Figure 1:
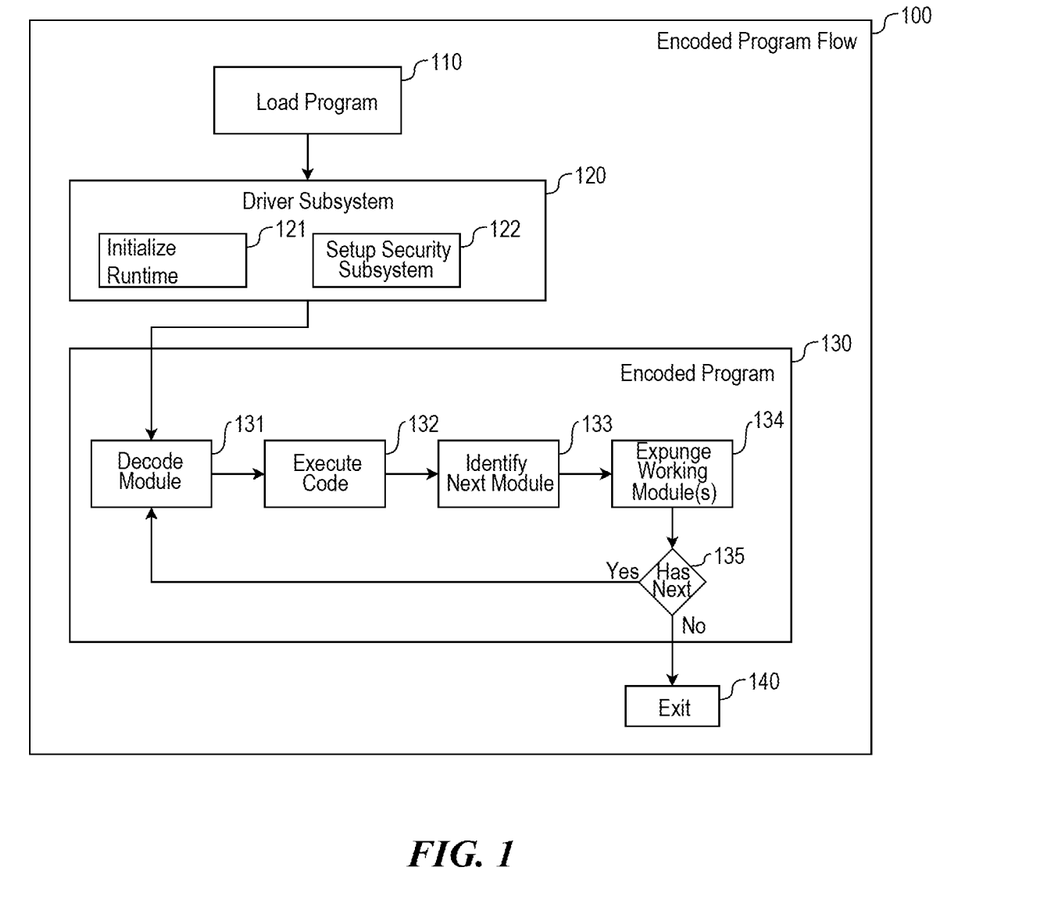
FIG. 1 is a flow diagram showing the encoded program and associated program flow characterizing the facility in some embodiments.

FIG. 1 is a flow diagram showing the encoded program and associated program flow characterizing the facility in some embodiments.

The encoded program flow 100 shows the process followed by the runtime environment for the entire lifecycle of the program to execute the program. Initially, the host operating system loads program 110, which creates the necessary data structures and memory allocations to hold the program in memory, find the main entry point, perform any necessary dynamic linking and memory relocations, and any other processes involved in launching and running an executable.

The driver subsystem 120 represents the entry point for the protected program, which performs the necessary bootstrapping actions before proceeding to execute the main logic of the protected program. The initialize runtime 121 act is where the data structures and utility functions are initialized prior to beginning program execution. This initialization act also detects the first encoded module for execution along with the necessary resource blocks to decode that module. In some embodiments, an additional setup security subsystem 122 act is used to initialize the system hardware components that support high-security encryption operations performed during program execution.

Figure 8:
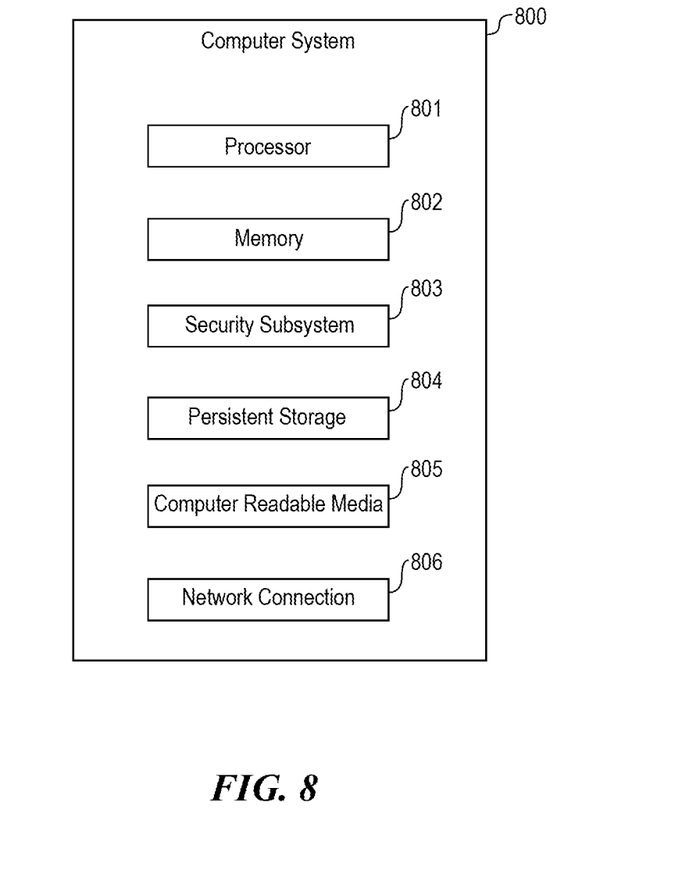
FIG. 8 is a block diagram showing some of the components typically incorporated in at least some of the computer systems and other devices on which the facility operates.

These system hardware components, in some embodiments, take advantage of Security Subsystem 803 (described below), and may include a hardware security module, protected enclave, or other subsystem that provides security guarantees such as inaccessible encryption keys, tamper detection, or protected decrypted memory contents.

Collectively, these acts within driver subsystem 120 represent the startup sequence for the program, and in some embodiments include additional logic and initialization appropriate for the program being protected. The logic and utilities from the driver subsystem are retained in memory for the lifetime of the program to make them available for use in all subsequent acts.

Once startup is complete, control is passed into the encoded program 130 to begin the main execution loop for the program. This processing flow generally causes the various working modules of the program to be initialized, decoded, executed, linked to other modules, and cleaned up.

The decode module 131 act decrypts, decompresses, and initializes data from an encoded block into a working module, as explained in greater detail below.

Code blocks are separately compressed and encrypted, with small fields added to the beginning of each compressed and encrypted block to allow the decoding logic to identify the Encoding Resource used to compress and encrypt the encoded block. This permits the driver subsystem to know the precise decryption algorithm and key to use to decrypt the block, as well as the particular scheme to use to decompress the block. In some embodiments, the fields are tightly packed, omitting padding that could accidentally reveal the boundaries between encoded blocks. Each combination of encryption and compression gives rise to a discrete Encoding Resource which is stored separately from the code block.

The execute code 132 act executes the program logic according to the target platform. Any needed relocations, memory initializations, and other logic normally performed by the host operating system are reproduced here using helper logic from driver subsystem 120. Program execution proceeds until control needs to be passed to some portion of the program that is not contained in this working module.

At this point, the program must conduct the identify next module 133 act and determine the encoded module and related encoding resources to allow the control flow to eventually pass back to decode module 131. In some embodiments, this act also determines if the current working module will be retained as a cached working module or expunged from memory. When the identified next module is already cached as a cached working module, the decode module 131 act is omitted.

Cached working modules may be held for a period of time longer than is required for execution, so as to avoid a significant performance penalty due to locality of reference effects, circular/looping logic, or other heuristically determined techniques. In various embodiments, a cached working module's staleness is determined during runtime using a simple algorithm such as a least-recently-accessed metric, or by a more complex algorithm where potential branch points are analyzed and targets are held in cache. In some embodiments, the determination of preferred module caching strategies is determined ahead of time, when the protected program is generated by means of a runtime execution profile or other machine generated or hand tuned configuration scheme. These caching hints are contained within the encoded block 222 and expanded into dynamic link stubs 242 in the working module, as described below in connection with FIG. 2.

Figure 2:
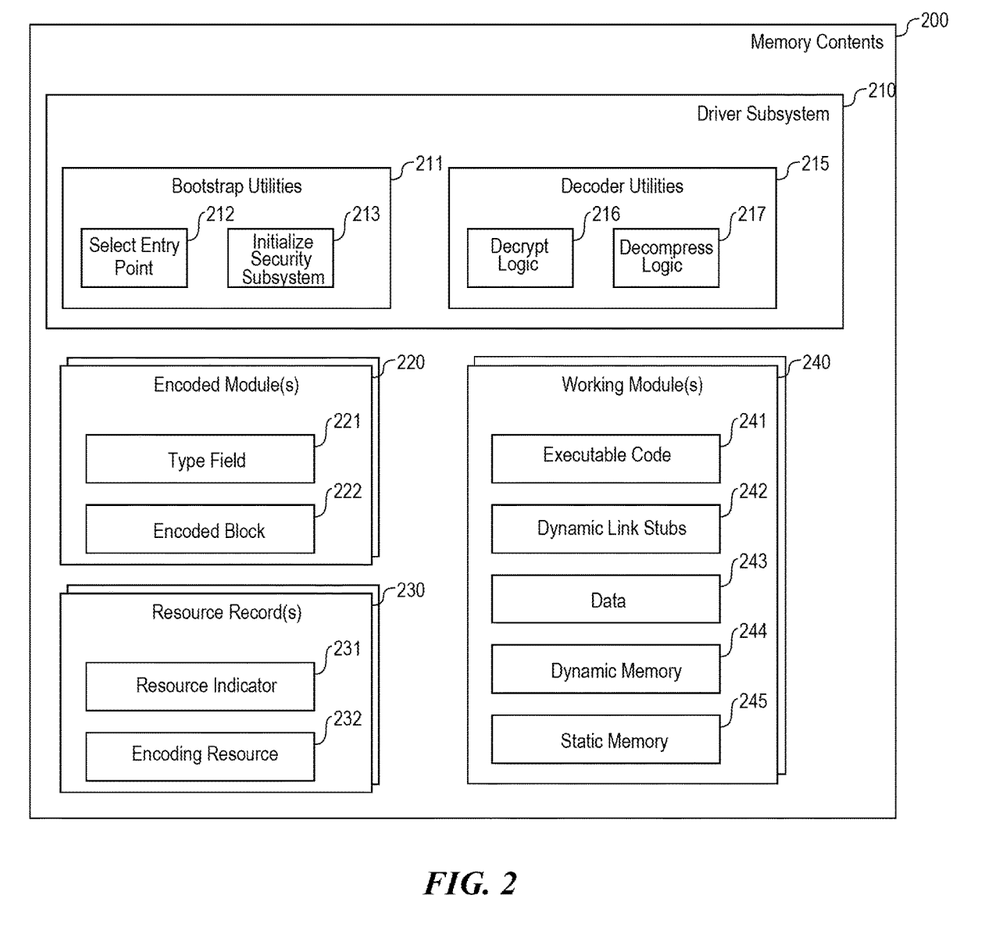
FIG. 2 is a block diagram showing contents of memory used by the facility in some embodiments.

The data structure to manage these staleness factors is controlled by the driver subsystem. In some embodiments, the cached working module allows decode module 131 to be omitted prior to passing control the to execute code act 132 in the next loop cycle. In some embodiments, the cached working module may be additionally protected from tampering using checksum or lightweight encryption techniques such as an XOR or rotate operation, effectively creating a transient resource record 230, described below.

When a working module is not selected for cache, or when a previously cached working module is expired, the expunge working module 134 act is executed, which causes all data in the working module to be released from memory. In some embodiments, this act overwrites or destroys the contents of the working module's memory, including any temporary storage associated with that module. This expunge operation also in some embodiments takes advantage of dedicated hardware support from the security subsystem 803, described below.

Upon completion of the previous act, the has next 135 test occurs, passing control back to decode module 131 should an additional encoded module require transformation into a working module, or else the program proceeds to exit 140 to return control to the operating system. As described above, in some embodiments, control is passed directly to a cached working module for execution 132 as the decode operation is unnecessary in this case. Any time execution proceeds to exit 140, all previously loaded working modules and cached working modules are unloaded via expunge working module 134.

FIG. 2 is a block diagram showing contents of memory used by the facility in some embodiments.

Memory contents 200 shows the relevant portions of system memory in use during execution of a protected program. The driver subsystem 210 contains various procedures and algorithms that load, decode, and execute the protected program.

While all executable content is encoded, the outer driver subsystem 210 is directly executable by the operating system. This subsystem acts as a wrapper and library for the protected program and uses obfuscation techniques such as those described in U.S. Provisional Patent Application No. 63/354,555.

The bootstrap utilities 211 provide the code to be executed to launch the protected program. The select entry point 212 logic includes the code necessary to initialize data structures and to load the initial encoded modules(s) and resource blocks(s). In at least some embodiments, the initialize security subsystem 213 code library configures the security subsystem 803 (described below) for use with the protected program to further enhance the security provided by the system.

The driver subsystem also includes decoder utilities 215: a set of libraries containing subroutines and algorithms that performs the decoding of encoded modules. Decryption logic 216 is available in at least some embodiments in order to provide access to the cryptographic algorithms and cryptographic modes used during initial encoding of the protected program. In some embodiments, the cryptographic algorithms and modes are supplied as a feature of security subsystem 803 and are not resident in unprotected system memory. In some embodiments, the decoder utilities also include decompress logic 217, which provides access to algorithms that perform decompression, used in some embodiments to perform the decode operation on encoded modules.

Encoded module(s) 220 represent the bulk of the protected program. For each encoded module, there is a type field 221 that contains enough information to select the appropriate resource record needed to decode this module. Encoded block 222 contains a portion of the actual body of the protected program. In some embodiments, the encoded block is encrypted. In some embodiments, the encoded block is compressed. The encryption and compression of the encoded block makes it difficult to analyze and reverse engineer by an attacker.

Resource record(s) 230 contain information used to perform the decode operation on the encoded block 222 of an encoded module 220. These resource records are selected using data in the type field 221 and matched with the resource indicator 231 within the resource record. This allows for multiple encoded modules 220 to potentially share resource records, and also allows for the in-memory location of the resource record to be held somewhere other than immediately adjacent to the encoded block 222, which provides another layer of complexity to make analysis and reverse engineering more difficult. Encoding resource 232 contains the information about precise details including algorithms, key materials, and initializations to be used when decoding encoded blocks.

Working Module(s) 240 are statically or dynamically allocated for storage of the actual machine processable code and data structures for the protected program. Executable working modules and cached working modules—as described in the encoded program flow 130—are examples of these Working Module(s) 240. The actual decrypted and decompressed data for the main body of the protected program is transiently resident in memory, is derived using a just-in-time algorithm, and is expunged as soon as each working module is no longer needed.

Each working module includes multiple components, as one skilled in the art will recognize as common among programs for computing systems. Executable code 241 holds machine instructions to be directly processed by the computer system. Dynamic link stubs 242 are used to replace external subroutine calls inside executable code and allow the driver subsystem to intercept calls to subroutines that are outside of the current working module. These dynamic link stubs provide the information used by the identify next module flow 133, described above. In some embodiments, dynamic link stubs are intermingled with the logic in executable code 241, making adversarial analysis and reverse engineering more difficult.

Data 243 includes fixed constants, string literals, and other unchanging values for use by the working modules executable code. Dynamic memory 244 provides memory for dynamic use by this module, as a stack, heap, or other memory construct used by the executable code for this working module. Static memory 245 provides the statically allocated memory, such as local variables and module shared variables used to support the executable code of this working module.

Figure 3:
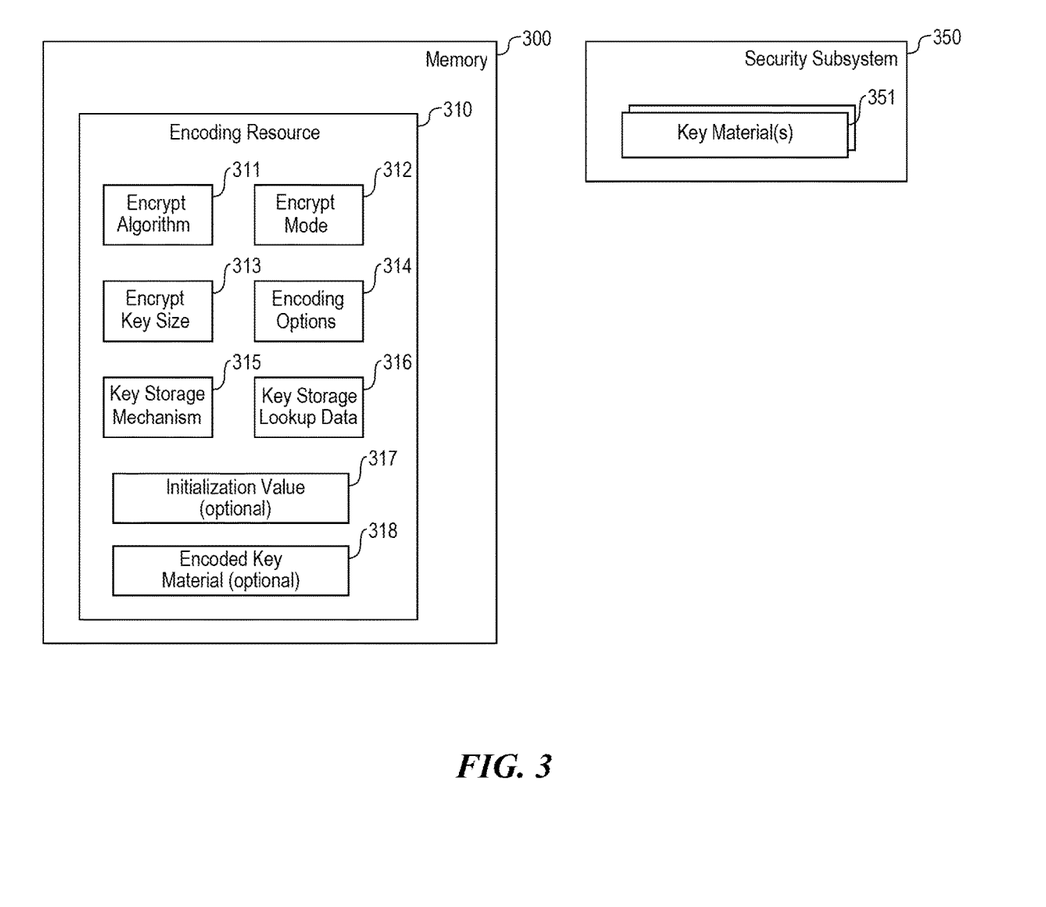
FIG. 3 is a block diagram showing the contents of an encoding resource used by the facility in some embodiments.

FIG. 3 is a block diagram showing the contents of an encoding resource used by the facility in some embodiments.

Memory 300 contains at least one encoding resource 310, used to hold the precise details needed to decode an encoded block, which in some embodiments is composed of an encryption algorithm, mode, initialization value, and key along with any compression and other encoding details.

The encrypt algorithm 311 specifies the basic encryption algorithm in use, such as AES, Twofish, or ChaCha. Encrypt mode 312 details the mode used by the encryption algorithm to actually encode the data, such as Cipher Block Chain (CBC), Electronic Code Book (ECB), or Galois Counter Mode (GCM). Encrypt key size 313 is used to determine the size of the key, such as 128, 192, or 256 bits for the AES cipher. The key sizes and encryption modes available depend on the particular algorithm in use, so some embodiments limit the available algorithms, modes, and key sizes for various reasons such as reduced complexity, availability of hardware acceleration, or standards compliance. While some combinations of encryption may be weaker than others, all available encryption options meet or exceed a minimum level of encryption configured by the user in some embodiments.

It is reasonable to include multiple encoding resource 310 combinations values with the same algorithm/mode/key size that differ only by encryption key value, and not all combinations of possible algorithm/mode/key size are necessarily used by any given protected program.

In addition to encryption, the encoding resource may in some embodiments include other encoding options 314 such as but not limited to data compression algorithms like LZ77, Huffman, or RLE; error correcting codes and checksums; or other encoding algorithms. In embodiments where compression and/or encoding is in use, an additional layer of complexity is provided to the overall program, making analysis more difficult while providing an additional benefit of smaller code size while only incurring a small cost in performance.

Once the details of the encoding are specified, the encoding resource also provides information necessary to actually load the necessary encryption key and initialization values. Key storage mechanism 315 specifies the location of the key material, which in some embodiments may be locally in the encoding resource, in an external security module, or elsewhere in the file system or memory, perhaps with a steganographic encoding. Key storage lookup data 316 holds parameters for the key storage mechanism, such as a decoding value for key material, an address in the security module, or a filesystem path. In some embodiments, the encryption algorithms are provided an initialization value 317 such as an initialization vector, nonce, or similar record. In some embodiments, encoded key material 318 are stored directly inside the encoding resource either in plain text, as a salted encoding, or other encoding means.

In addition to storage inside memory 300, the encoding reference may specify the use of security subsystem 350 in some embodiments. When used, this hardware-supported subsystem provides a secure and tamper-resistant means to store key materials 351, and may also provide additional services such as secure decryption, asynchronous memory wipe, or other operations.

Figure 4:
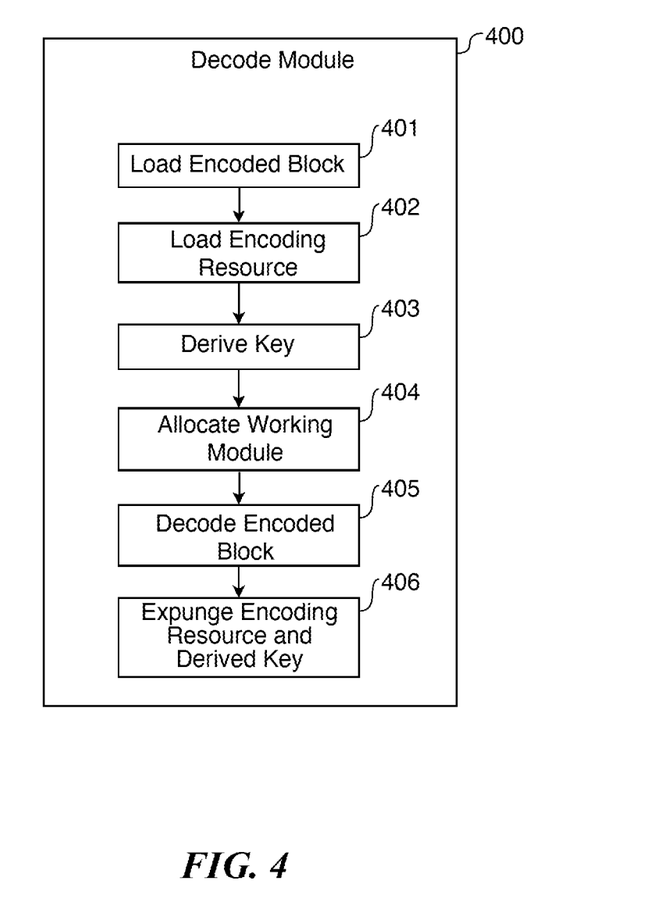
FIG. 4 is a flow diagram showing the decode module program flow characterizing the facility in some embodiments.

FIG. 4 is a flow diagram showing the decode module program flow characterizing the facility in some embodiments.

Decode module 400 is an expanded and detailed view of flow 131 (from FIG. 1) describing the process to transform an encoded block 222 (from FIG. 2) into a working module 240 (also in FIG. 2) by applying the algorithms and procedures specified by the encoding resource 310 (from FIG. 3).

The first act is to load encoded block 401, which was specified prior to entry into this flow, either by the initialize runtime 121 or identify next module 133 acts from FIG. 1. The memory for this encoded block may vary by embodiment, being allocated statically or dynamically in memory 300, or via the security module 350 (both from FIG. 3). Next, the decode algorithms are specified by the load encoding resource act 402, providing access to the encryption algorithm, mode, and initialization along with other encoding details. Derive key act 403 is then executed, which discovers the key material as specified by the encoding resource, which in some embodiments may be locally, in the security module, or via other means.

At this point, the decode module process has enough information to perform the allocate working module act 404, which provides enough storage for the components of the actual code to be executed in the working module along with any necessary data, dynamic, and static memory.

Next, the encoded block is decoded according to the algorithms, mode, initialization, and keys specified by the encoding resource. This decoded result is stored in memory such that the computing system is able to execute the decoded executable code and will be marked as read-only, read-write, or executable as appropriate for the particular subcomponents of the working module. This act also initializes the mappings in dynamic link stubs 242 such that the identify next module flow 133 is able to maintain mappings between code paths and their associated encoded modules or working modules. In some embodiments, the data structure for cached working modules is updated.

Once the decoding process is complete, the decode module will perform the expunge encoding resource and derived key 406 act to ensure that an external analysis is unable to observe this intermediate result, such as partial progress or the complete result of the derived key material or of the algorithmic acts to decode the encoded block. In some embodiments, the derived key material is held externally to system memory in the security subsystem.

Overall, the variety of encryption and compression techniques greatly increase the difficulty in decoding the executable for attackers while incurring only a reasonable overhead for the user of the application.

Figure 5:
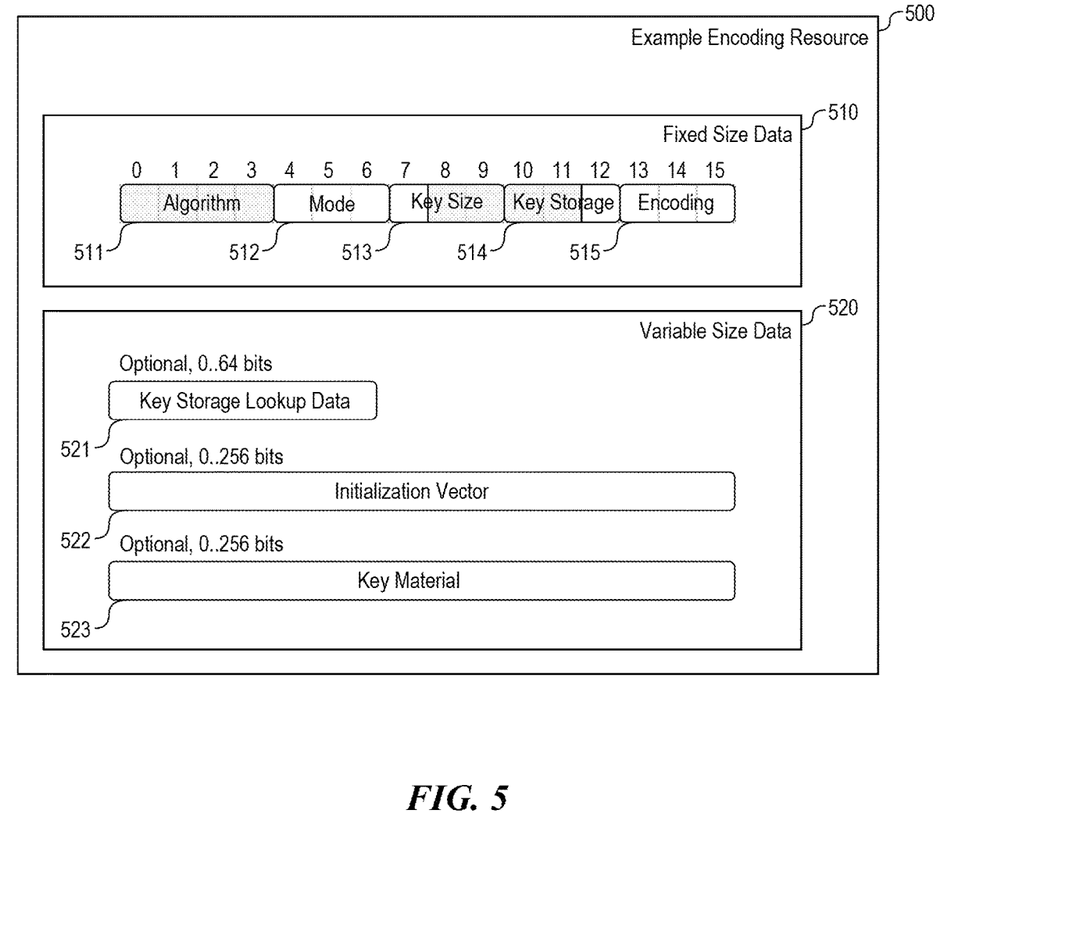
FIG. 5 is a detailed encoding resource binary representation demonstrating an example embodiment.

FIG. 5 is a detailed encoding resource binary representation demonstrating an example embodiment.

Example binary encoding 500 shows a sample memory layout for an encoding resource 232, as contained in a resource record 230. In this embodiment, the data is separated into fixed size data 510 and variable size data 520. As shown, fixed data fields are a densely packed binary record, representing 5 enumerated values in a total of 16 bits.

The algorithm field 511 is a 4 bit enumeration having 16 possible values that specifies the algorithm used to encrypt the encoded block, with possible values 0=none, 1=xor, 2=aes, 3=chacha, etc.

The mode field 512 is a 3 bit enumeration having 8 possible values that specifies the encryption mode used by algorithm 511. Possible values are 0=none, 1=rotate, 2=galois counter mode, 3=cipher block chain. This field depends on the value for algorithm 511 to be meaningful, such as if the algorithm is 0=none, then this value is not read, and should also be populated as 0=none.

The key size field 513 is a 3 bit enumeration having 8 possible values that specifies the encryption key size used by algorithm 511. Possible values are 0=none, 1=128 bit key, 2=192 bit key, 3=256 bit key. This field depends on the value for algorithm 511 to be meaningful, such as if the algorithm is 0=none, then this value is not read, and should also be populated as 0=none.

The key storage field 514 is a 3 bit enumeration having 8 possible values that specifies the encryption storage mechanism used to recover the key used by algorithm 511. Possible values are 0=none, 1=encoding resource, 2=steganography, 3=hardware security subsystem. This field depends on the type of encryption in use by algorithm 511, such as if the algorithm is 0=none, then this value is not read, and should also be populated as 0=none.

The encoding field 515 is a 3 bit enumeration having 8 possible values that specifies the encoding and compression mechanism. Possible values are 0=no compression, 1=LZ77, 2=Huffman, 3=Run Length Encoding (RLE), 4=gzip adaptive encoding, etc.

In the variable size data 520 section, the data fields may or may not be present and their associated sized depend on the values in the fixed size data section 510.

Key storage lookup data 521 is a field holding metadata about how the encryption key is stored. For example, where algorithm 511 specified AES and key storage 514 specifies the hardware security subsystem, this field contains a 64 bit encoding hash to be used with the security hardware. If key storage specifies a steganographic encoding, then this field holds enough information to discover and decode that key (such as a steganography mode, base address, and window size). If key storage 514 is none, then this field will not be present at all.

Encryption initialization vector 522 is a field holding public and non-secret initialization vector or nonce used by encryption algorithm 511. For example, where algorithm 511 specified AES and key size 513 is 256 bits, this field contains a 256 bit value to be used when initializing the encryption mechanism. If algorithm is none or xor, then this field will not be present at all.

Key material 523 is a field holding the private key used by encryption algorithm 511. For example, where algorithm 511 specifies XOR and key size 513 specifies a 256 bit key and key storage 514 specifies local storage, this field contains a 256 bit value to be used as an XOR operand. If key storage is not specified as local, then this field will not be present at all.

Figure 6:
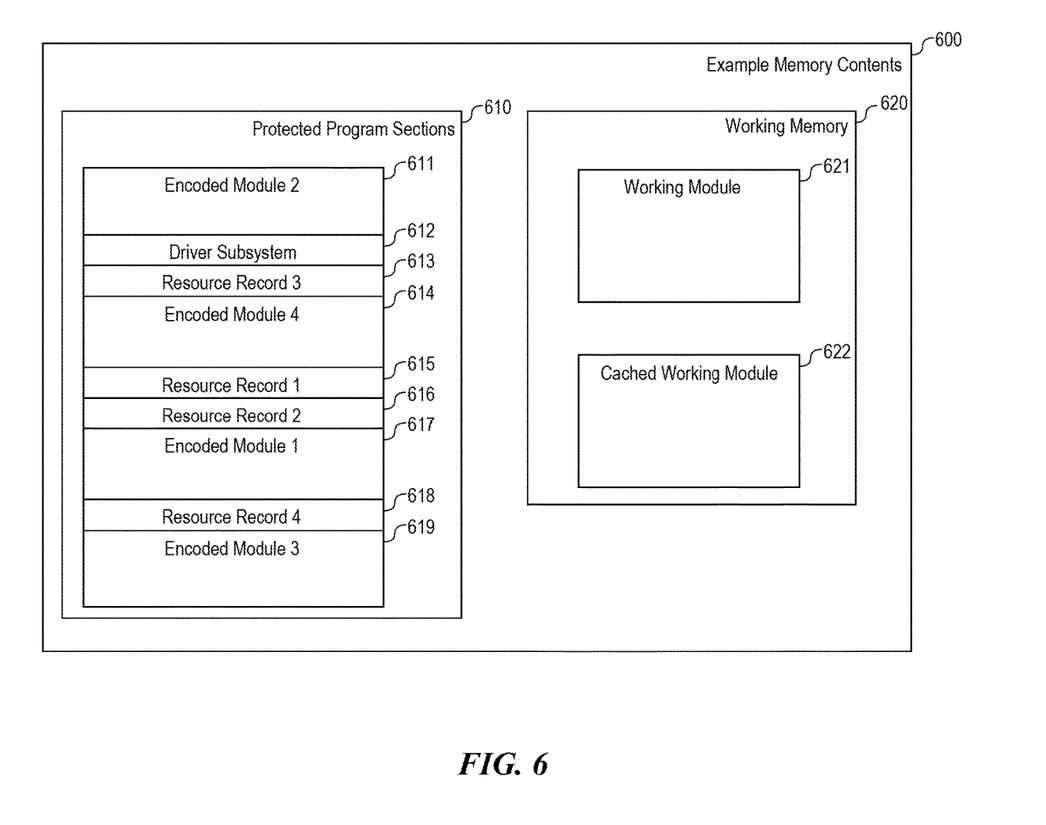
FIG. 6 is a runtime memory layout demonstrating an example embodiment of a protected program during execution.

FIG. 6 is a runtime memory layout demonstrating an example embodiment of a protected program during execution.

Example memory contents 600 shows a possible memory layout for a protected program 610 and its associated working memory 620.

Protected program sections 610 represent the entire binary, and includes the driver subsystem 612 corresponding to item 210 and contained elements from FIG. 2, multiple encoded modules 611, 614, 617, and 619 which correspond to item(s) 220 and contained elements from FIG. 2, and multiple resource records 613, 615, 616, and 618 which correspond to item(s) 230 from FIG. 2. The in-memory order of the driver, encoded modules, and resource records were randomized when the protected program was generated.

During program startup, execution starts at the main logic entry point inside of driver 612. While driver is executing, data from that section is loaded to specify that the protected program initial entry is contained in an encoded module 617 with corresponding resource record 615. Logic from driver executes decode module logic 400 (from FIG. 4) to generate a working module 621 to correspond with the detected encoded module and resource record. Once decoded, execution is then passed to the code block within module 621.

As execution proceeds, the identify next module 133 (from FIG. 1) may determine that execution must be passed to another encoded module 619. Metadata stored within this subroutine's dynamic link stub informs the expunge 134 act that the current working module need not be destroyed, and thus may be saved for future use as cached working module 622. Decode proceeds with encoded module 619 and its associated resource record 613.

Execution continues, potentially loading encoded modules 611 with resource record 616 or encoded module 614 with resource record 618. In some cases, the dynamic link stub may indicate that the working module may be cached, and in other cases, it will indicate that the working module should be expunged.

Figure 7:
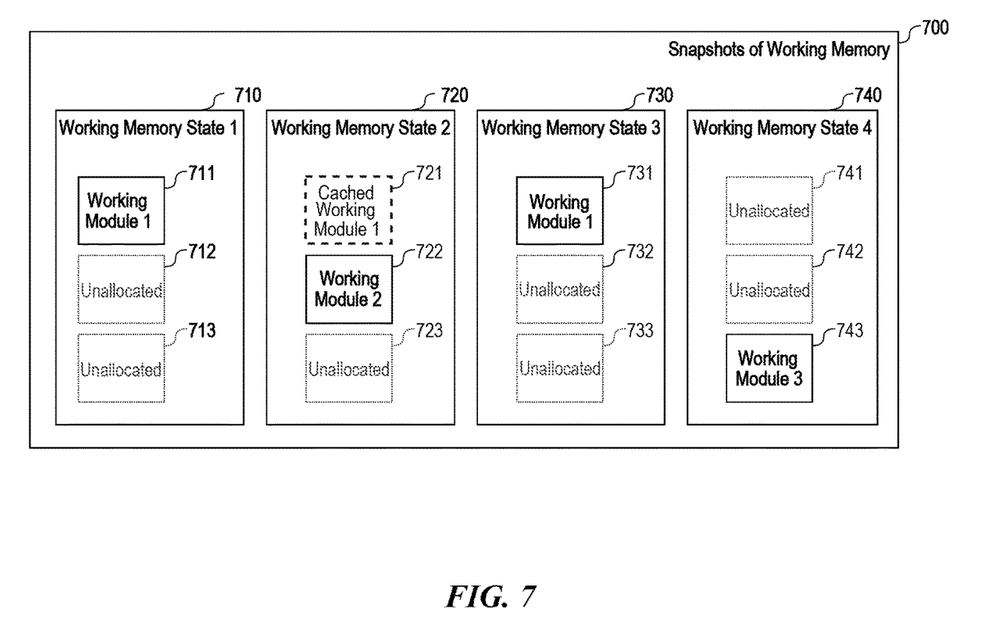
FIG. 7 is a block diagram showing a sample series of snapshots of working memory as the facility manages the contents of working memory to include appropriate working modules while execution of the program proceeds.

FIG. 7 is a block diagram showing a sample series of snapshots of working memory as the facility manages the contents of working memory to include appropriate working modules while execution of the program proceeds.

Snapshots of working memory 700 shows multiple states of memory during execution of a program similar to the example provided in FIG. 6. In this example, encoded modules 1, 2, and 3 of the program are reached.

In the first working memory state 710, encoded module 617 has been transformed to working module 711. Additional unallocated memory is represented in this diagram as 712 and 713 for clarity and explanatory purposes only—it is neither needed nor in use by the protected program at this time.

As execution progresses, the logic in working module 1 (711) encounters an external subroutine call into encoded module 2 (611 from FIG. 6). Additionally, that subroutine call includes metadata to allow the identify next module (133 from FIG. 1) to consider the calling working module as a candidate for caching. In this example embodiment, the proposed cross-module subroutine call is known to be short-lived with a quick return to the current working module.

Working memory state 720 shows the memory snapshot once execution control is passed to the newly decoded state of encoded module 2 as working module 2 (722). The old working module 711 has been reclassified as a cached working module 721, as it remains resident in memory and is not currently encoded with the Magic Shell dynamic encryption technique. Additional unallocated memory 723 is shown for clarity and explanatory purposes only, and is neither needed nor is in use by the protected program at this time.

Upon completion of the short-lived execution in working module 722, control is due to be returned to the cached working module 721. At this point, there is no need to decode any working modules, nor any need to transition working module 722 into a cached state.

Working memory state 730 shows the updated memory snapshot once execution is returned to working module 731, which is the reclassified state of formerly cached working module 721. The previous working module 722 has been expunged, so the old memory is now unallocated 732. Additional unallocated memory 733 is shown for clarity and explanatory purposes only, and is neither needed nor is in use by the protected program at this time.

As execution continues to progress, the logic of working module 1 (731) encounters a subroutine call into encoded module 3 (619 from FIG. 6). In this case, the subroutine call metadata does not allow the calling working module to be a candidate for caching, so expunge working module (134 from FIG. 1) will execute normally by expunging working module 1 (731).

Working memory state 740 shows the updated memory snapshot once execution is passed into working module 743. The previous working module 731 has been expunged, so the memory that previously contained it is now unallocated 741. Additional unallocated memory 742 is shown for clarity and explanatory purposes only, and is neither needed nor in use by the protected program at this time.

Execution proceeds from this point, with control being passed between working modules as necessary. In each case, the encoded program main loop 130 from FIG. 1 processes cached working modules or otherwise expunge memory as necessary. In some embodiments, multiple cached working modules are retained in memory, as occasionally execution is passed between multiple working modules in rapid succession. In some embodiments, cached working modules are avoided altogether, either as an operational preference or where the program structure does not require short-lived cross-module calls.

FIG. 8 is a block diagram showing some of the components typically incorporated in at least some of the computer systems and other devices on which the facility operates.

In various embodiments, these computer systems and other devices 800 can include desktop computer systems, embedded computer systems, server computer systems, cloud computing platforms or virtual machines in other configurations, desktop computer systems, laptop computer systems, netbooks, mobile phones, personal digital assistants, televisions, cameras, automobile computers, electronic media players, etc. In various embodiments, the computer systems and devices include zero or more of each of the following: a processor 801 for executing computer programs and/or training or applying machine learning models, such as a CPU, GPU, TPU, NNP, FPGA, or ASIC; a computer memory 802 for storing programs and data while they are being used, including the facility and associated data, an operating system including a kernel, and device drivers; a hardware supported security subsystem 803 with trusted cryptography support such as a hardware security module, secure enclave, or similar; a persistent storage device 804, such as a hard drive or flash drive for persistently storing programs and data; a computer-readable media drive 805, such as a floppy, CD-ROM, or DVD drive, for reading programs and data stored on a computer-readable medium; and a network connection 806 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. While computer systems configured as described above are typically used to support the operation of the facility, those skilled in the art will appreciate that the facility may be implemented using devices of various types and configurations, and having various components.

CONCLUSION

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method in a computing system, comprising:
accessing a set of encrypted modules across which an executable program is encoded, each of the encrypted modules specifying an encoding resource containing information usable to decrypt the encrypted module;
identifying a first one of the encrypted modules containing an entry point for the program;
accessing the encoding resource specified for the first encrypted module;
using contents of the accessed encoding resource specified for the first encrypted module to decrypt the first encrypted module, decryption of the first encrypted module resulting in a first decrypted module corresponding to the first encrypted module being stored in working memory;
executing the program within the first decrypted module, to a point at which the first decrypted module specifies a call to a first non-local subroutine;
in response to reaching the point at which the first decrypted module specifies a call to the first non-local subroutine:
identifying a second one of the encrypted modules containing an entry point for the first non-local subroutine, the second encrypted module being distinct from the first encrypted module;
using contents of the accessed encoding resource specified for the second encrypted module to decrypt the second encrypted module, decryption of the second encrypted module resulting in a second decrypted module corresponding to the second encrypted module being stored in working memory;
expunging the first decrypted module from working memory; and
executing the first non-local subroutine within the second decrypted module.

2. The method of claim 1 wherein the method is performed by a driver subsystem executing on the computing system.

3. The method of claim 1 wherein, in addition to each of the encrypted modules of the set being encrypted, each of the encrypted modules of the set is compressed,
and wherein the encoding resource specified for each of the encrypted modules contains information usable to decompress the encrypted module,
the method further comprising:
using contents of the accessed encoding resource specified for the first encrypted module to decompress the first decrypted module, decompression of the first decrypted module resulting in a first decompressed module corresponding to the first encrypted module being stored in working memory, wherein it is the first decompressed module within which the program is executed;
erasing the first decrypted module from working memory;
in response to reaching the point at which the first decrypted module specifies a call to the first non-local subroutine:
using contents of the accessed encoding resource specified for the second encrypted module to decompress the second decrypted module, decompression of the second decrypted module resulting in a second decompressed module corresponding to the second encrypted module being stored in working memory, wherein it is the second decompressed module within which the first non-local subroutine is executed; and
erasing the second decrypted module from working memory.

4. The method of claim 1 wherein metadata of the call to the first non-local subroutine is used to identify the second encrypted module.

5. The method of claim 1 wherein the first decrypted module is expunged from working memory in response to metadata of the call to the first non-local subroutine.

6. The method of claim 1 wherein execution of the first non-local subroutine within the second decrypted module reaches a call to a second non-local subroutine,
the method further comprising:
in response to reaching the point at which the second decrypted module specifies a call to the second non-local subroutine:
identifying a third one of the encrypted modules containing an entry point for the second non-local subroutine, the third encrypted module being distinct from the second encrypted module;
using contents of the accessed encoding resource specified for the third encrypted module to decrypt the third encrypted module, decryption of the third encrypted module resulting in a third decrypted module corresponding to the third encrypted module being stored in working memory; and
executing the second non-local subroutine within the third decrypted module while retaining the second decrypted module in working memory.

7. The method of claim 6 where retaining the second decrypted module in working memory during execution of the second non-local subroutine is in response to metadata of the call to the second non-local subroutine.

8. One or more computer memories collectively storing a data structure usable to enable a processor to securely execute a program organized into subroutines, the data structure comprising:
a first working module in working memory comprising executable code for the program that includes executable code for a first non-local subroutine, a program counter register of the processor identifying a location in the first working module, the first working module having been decoded from a corresponding first encoded module and stored in decoded form in working memory in response to a call to the first non-local subroutine from a second working module that was in working memory at the time of the call, such that working memory contains a decoded version of only a proper subset of all of the executable code of the program,
wherein the second working module was expunged from working memory in response to the call to the first non-local subroutine,
such that, when the call to the first non-local subroutine returns, resuming execution in the second module involves decoding the second working module from a corresponding second encoded module.

9. The one or more computer memories of claim 8, the data structure further comprising:
a second cached working module retained in working memory in response to the call to the first non-local subroutine,
such that, when the call to the first non-local subroutine returns, resuming execution in the second module can occur without decoding the second working module from a corresponding second encoded module.

10. The one or more computer memories of claim 9, the data structure further comprising:
metadata attached to the call to the first non-local subroutine in the second working module specifying retention of the second cached working model in response to the call to the first non-local subroutine.

11. The one or more computer memories of claim 9, the data structure further comprising:
the first encoded module, stored in connection with a type field containing a resource indicator identifying an encoding resource, the encoding resource having contents specifying details of a process for performing the decoding of the first encoded module to obtain the first working module.

12. The one or more computer memories of claim 11, the data structure further comprising:
a plurality of resource records, each resource record comprising:
an encoding resource; and
a resource indicator identifying the encoding resource, such that, when an encoded module is to be decoded, the resource indicator in its type field can be used to locate the corresponding resource record, read the contained encoding resource, and use the details it contains to perform the decoding.

13. The one or more computer memories of claim 12 wherein the encoding resource for distinguished one of the plurality of resource records comprises:
a decryption algorithm;
a decryption mode;
a decryption key size;
a decryption key;
a reference to a separately-stored decryption key;
an initialization value;
a decompression algorithm; and/or
one or more decompression configuration values.

14. The one or more computer memories of claim 12, the data structure further comprising:
a second encoded module corresponding to the second decoded module, stored in connection with a type field containing a resource indicator that is different from the resource indicator contained by the type field in connection with which the first encoded module is stored.

15. One or more computer-readable devices collectively storing a data structure usable to enable a processor to securely execute a program, the data structure comprising:
a plurality of encoded modules, each encoded module comprising:
an encoded block, and
a type field containing a resource indicator identifying an encoding resource, the encoding resource having contents specifying details of a process for decoding the encoded block to obtain a working module comprising executable code for a portion of the program; and
a plurality of resource records, each resource record comprising:
an encoding resource, and
a resource indicator identifying the encoding resource, such that, when the encoded block of an encoded module is to be decoded, the resource indicator in its type field can be used to locate the corresponding resource record, read the contained encoding resource, and use the details it contains to perform the decoding.

16. The one or more computer-readable devices of claim 15 wherein, for each of the encoded modules, the resource indicator identifies an encoding resource whose contents specify decryption details.

17. The one or more computer-readable devices of claim 15 wherein, for each of the encoded modules, the resource indicator identifies an encoding resource whose contents specify decompression details.

18. One or more computer-readable devices collectively having contents configured to cause a computing system to perform a method for managing an in-memory representation of a program, the method comprising:
executing a first decoded module comprising a first portion of executable code of the program;
encountering in the execution of the first decoded module a dynamic link stub representing a call to a first non-local subroutine;
in response to the encountering:
from the dynamic link stub, identifying an encoded module containing an encoded representation of the first non-local subroutine;
using contents of an encoding resource specified for the identified encoded module to decode the identified encoded module, decode of the identified encoded module resulting in a second decoded module corresponding to the identified encoded module being stored in working memory; and
executing the first non-local subroutine within the second decoded module.

19. The one or more computer-readable devices of claim 18 wherein the decoding comprises:
loading into working memory an encoded block contained by the identified encoded module;
loading into working memory an encoding resource specified for the identified encoded module;
deriving a decryption key using contents of the loaded encoding resource;
allocating working memory for a new working module;
using the derived decryption key to decrypt the loaded encoded block in accordance with contents of the loaded encoding resource into the allocated working module; and
expunging from working memory the loaded encoded block and encoding resource.

20. The one or more computer-readable devices of claim 19 wherein the deriving is performed by a security subsystem.

21. The one or more computer-readable devices of claim 19 wherein the decrypted encoded block is decompressed before being placed into the allocated working module.

22. The one or more computer-readable device of claim 18, the method further comprising: accessing metadata for the call contained by the dynamic link stub, the accessed metadata specifying whether the decoded module containing the dynamic link stub should be cached or expunged upon completing the non-local subroutine call to which the dynamic link stub corresponds; where the accessed metadata specifies that the decoded module containing the dynamic link stub should be cached upon performing the non-local subroutine call to which the dynamic link stub corresponds, omitting to expunge the first decoded module in response to the encountering; and where the accessed metadata specifies that the decoded module containing the dynamic link stub should be expunged upon performing the non-local subroutine call to which the dynamic link stub corresponds, expunging the first decoded module in response to the encountering.

* * * * *